US011621019B2

(12) United States Patent
Harper et al.

(10) Patent No.: US 11,621,019 B2
(45) Date of Patent: Apr. 4, 2023

(54) PORTABLE TAPE STORAGE ON A MOBILE PLATFORM

(71) Applicant: International Business Machines Corporation, Armonk, NY (US)

(72) Inventors: David Harper, Vail, AZ (US); Gregory Goodman, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 912 days.

(21) Appl. No.: 16/525,709

(22) Filed: Jul. 30, 2019

(65) Prior Publication Data

US 2021/0035601 A1 Feb. 4, 2021

(51) Int. Cl.
G11B 5/008 (2006.01)
B60R 16/03 (2006.01)
B60R 11/02 (2006.01)
G06F 3/06 (2006.01)
B60R 11/00 (2006.01)
H04W 4/38 (2018.01)

(52) U.S. Cl.
CPC ...... G11B 5/00813 (2013.01); B60R 11/0211 (2013.01); B60R 16/03 (2013.01); G06F 3/0674 (2013.01); G06F 3/0676 (2013.01); G06F 3/0682 (2013.01); *B60R 2011/004* (2013.01); *B60R 2011/008* (2013.01); *H04W 4/38* (2018.02)

(58) Field of Classification Search
USPC .......................................................... 701/36
See application file for complete search history.

(56) References Cited

U.S. PATENT DOCUMENTS

| 6,842,841 | B1* | 1/2005 | Kuik | G06F 3/0686 |
| | | | | 711/111 |
| 8,230,235 | B2* | 7/2012 | Goodman | G06F 21/6218 |
| | | | | 713/193 |
| 9,195,402 | B1* | 11/2015 | Hostetter | G06F 3/0647 |
| 9,928,009 | B1* | 3/2018 | Frink | G06F 3/0658 |
| 10,885,780 | B1* | 1/2021 | Bseileh | G08G 1/087 |
| 2007/0094382 | A1* | 4/2007 | Ballard | H04L 43/04 |
| | | | | 709/224 |
| 2007/0124284 | A1* | 5/2007 | Lin | G06F 16/3334 |
| 2016/0041915 | A1* | 2/2016 | Hostetter | G11B 5/00813 |
| | | | | 709/217 |

(Continued)

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

*Primary Examiner* — Behrooz M Senfi
(74) *Attorney, Agent, or Firm* — Jared L. Montanaro

(57) ABSTRACT

A system may include one or more tape drives. A front portion of the one or more tape drives may be exposed to allow access to one or more respective tape cartridges of each of the one or more tape drives. The system may include one or more servers. The one or more servers may control the one or more tape drives. The system may include one or more ports communicatively connected to the one or more tape drives. Each of the one or more ports may respectively be associated with a specific sensor. Each of the specific sensors may record a specific datum. The system my include one or more power supplies.

20 Claims, 6 Drawing Sheets

(56) References Cited

U.S. PATENT DOCUMENTS

| | | | |
|---|---|---|---|
| 2016/0150313 A1* | 5/2016 | Howard | H04R 1/025 381/71.4 |
| 2018/0040172 A1 | 2/2018 | Funk | |
| 2018/0050704 A1 | 2/2018 | Tascione et al. | |
| 2018/0364711 A1 | 12/2018 | Goldfain et al. | |
| 2022/0221842 A1* | 7/2022 | Cella | G05B 19/4183 |

* cited by examiner

PORTABLE TAPE STORAGE ON A MOBILE PLATFORM

BACKGROUND

The present disclosure relates generally to the field of tape storage, and more specifically to collecting mass data onboard a mobile platform via a portable tape storage system.

Autonomous vehicles are becoming more prevalent in today's marketplace. These autonomous vehicles work by having numerous sensors place around them to detect obstacles, environmental factors, regulate speed, etc. Large amounts of data are collected from the numerous sensors and analyzed to help future iterations of autonomous vehicles.

SUMMARY

Embodiments of the present disclosure include a system and a method for collecting a variety of real-time sensor data while a vehicle is mobile/moving/running. A system may include one or more tape drives. A front portion of the one or more tape drives may be exposed to allow access to one or more respective tape cartridges of each of the one or more tape drives. The system may include one or more servers. The one or more servers may control the one or more tape drives. The system may include one or more ports communicatively connected to the one or more tape drives. Each of the one or more ports may respectively be associated with a specific sensor. Each of the specific sensors may record a specific datum. The system my include one or more power supplies.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
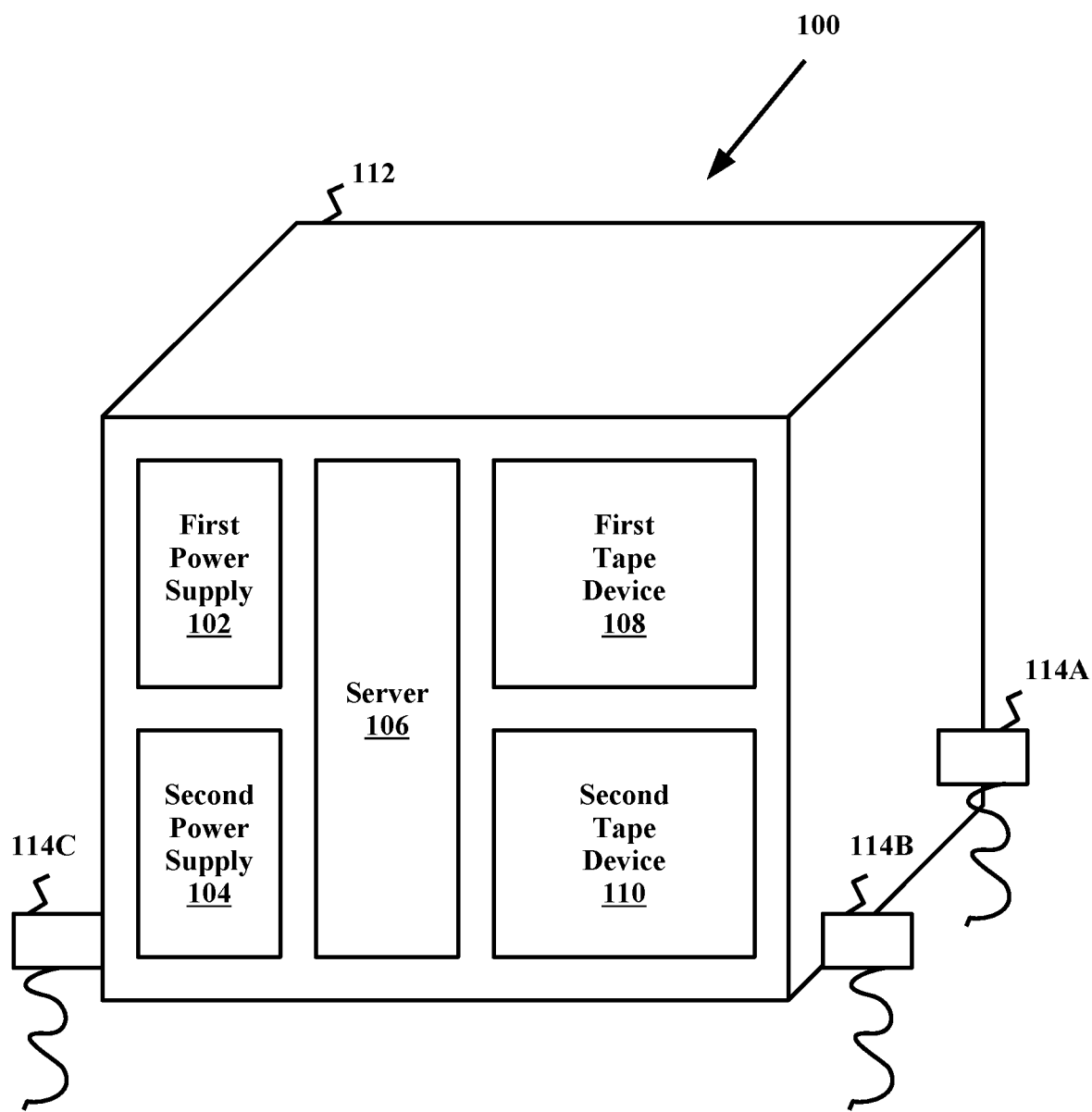
FIG. 1 illustrates an example system for the collection of mass data onboard a mobile platform, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of tape storage, and more specifically to collecting mass data onboard a mobile platform via a portable tape storage system. While the present disclosure is not necessarily limited to such applications, various aspects of the disclosure may be appreciated through a discussion of various examples using this context.

With the growth of "smart cars" and autonomous vehicles (e.g., driverless boats, airplanes, etc.) in the marketplace, there exists a need for companies developing such vehicles to be able to collect a variety of sensor data in real-time. Therefore, a unique system/device that can enable the use of a tape drive in an enclosure that can be installed and removed from a test vehicle is envisioned. The system can be used to collect the data in real-time, as the user/developer desires, by having the data streamed into a portable tape storage device while the vehicle is in use.

Disclosed hereinbelow is a unique system/device that stores large amounts of data (e.g., hundreds of gigabytes, terabytes, tens of terabytes, etc.) in real-time for the purposes of advancing the development of autonomous or semi-autonomous vehicles. The storage of large amounts of data at one time minimizes the needs for multiple stops by the vehicles in order to physically collect storage containers that are currently used and which hold less data, and the utilization of tape storage provides security for the storage of the recorded data as tape has a long storage life and is harder to damage than current disk storage use.

In some embodiments, the system may be a portable system that fits within a volume less than a typical vehicle trunk size and which may contain one or more tape drives that can each hold at least a single cartridge. Further, in some embodiments, power supplies or servers may be integrated into the system to operate, transfer data, and provide power to the tape drives during use.

In some embodiments, the system may be mounted on shock absorber-type devices to minimize external vibration and draw power from the vehicle's power supply (e.g., in the case of adaptative suspension, etc.). For example, the system may be powered from the batteries of a vehicle. In some embodiments, the system disclosed herein may be used to collect telemetry data in real-time, as the developer desires, by having the data streamed into the portable tape storage device while the vehicle is being used.

It is noted that, currently, there exists a disk-based solution for such large amounts of data collection for autonomous/semi-autonomous vehicles, but it is limited in data rate. One of the advantages of the system presented in this disclosure is the use of a portable tape storage device, or devices, that have a higher data rate than a disk-based solution. A single tape drive can store data at a rate of 400 Megabytes per second with future generations promising even higher data rates. A disk drive can store data at a rate of 100 to 200 Megabytes per second and requires the parallel operation of multiple disk drives to achieve higher data rates. Further, the storage capability of a single tape cartridge exceeds the capacity of a typical disk drive. Where a disk drive may hold between two to three Terabytes of data, a tape cartridge may hold between 12 to 20 Terabytes of (uncompressed) data. With a system that may have one or more tape drives, along with one or more (optional) power supplies, and one or more (optional) servers, the collection of mass data in real-time can be realized with the advantage of a high-speed data rate.

Example embodiments will now be described more fully herein with reference to the accompanying drawings, in which example embodiments are shown. This disclosure may, however, be embodied in many different forms and should not be construed as limited to the example embodiments set forth herein. Rather, these example embodiments are provided so that this disclosure will be thorough and complete and will convey the scope of this disclosure to those of ordinary skill in the art. In the description, details of well-known features and techniques may be omitted to avoid unnecessarily obscuring the presented embodiments.

For purposes of the description hereinafter, terms such as "upper," "lower," "right," "left," "vertical," "horizontal," "top," "bottom," and derivatives thereof shall relate to the disclosed structures and methods, as oriented in the drawing figures. Terms such as "above," "overlying," "atop," "on top," "positioned on," or "positioned atop" mean that a first element, such as a first structure, is present on a second element, such as a second structure, wherein intervening elements, such as an interface structure, may be present between the first element and the second element. The term "direct contact" means that a first element, such as a first structure, and a second element, such as a second structure, are connected without any intermediary conducting, insulating, or semiconductor layers at the interface of the two elements. The term substantially, or substantially similar, refers to instances in which the difference in length, height, or orientation convey no practical difference between the definite recitation (e.g. the phrase sans the substantially similar term), and the substantially similar variations. In one embodiment, substantial (and its derivatives) denote a difference by a generally accepted engineering or manufacturing tolerance for similar devices, up to, for example, 10% deviation in value or 10° deviation in angle.

In the interest of not obscuring the presentation of embodiments of the present disclosure, in the following detailed description, some processing steps or operations that are known in the art may have been combined together for presentation and for illustration purposes and in some instances, may have not been described in detail. In other instances, some processing steps or operations that are known in the art may not be described at all. It should be understood that the following description is rather focused on the distinctive features or elements of various embodiments of the present disclosure.

Referring now to FIG. 1, illustrated is an example system 100 for the collection of mass data onboard a mobile platform (e.g., moving vehicle, etc.), in accordance with embodiments of the present disclosure. In some embodiments, the system 100 includes a box enclosure 112 with supports 114A-C that are positioned near a bottom portion of the box enclosure 112 and that are attached to "springs" that indicate a shock-absorbing device and/or dampener.

Although not depicted, it is envisioned that there are supports on all four corners, or near each corner, of the box enclosure 112 (e.g., there is a fourth support that is positioned behind the support 114C and opposite in side to the support 114A). In some embodiments, the supports may be solid beams that extend along an entire edge of the box enclosure 112.

In some embodiments, the box enclosure 112 encapsulates/houses a first power supply 102, a second power supply 104, a server 106, a first tape device 108, and a second tape device 110. In some embodiments, the first and second tape devices 108 and 110 may be tape drives (e.g., one or more tape drives) that can each, respectively, hold portable tape media cartridges (not shown) that will store the real-time data. It is noted that a front portion of the first and second tape devices 108 and 110 are exposed by the box enclosure 112 to allow access to the above-mentioned portable tape media cartridges.

In some embodiments, the server 106 controls the first and second tape devices 108 and 110 by operating the first and second tape devices 108 and 110, transferring data to and from the first and second tape devices 108 and 110, and/or determining when or if to provide power to the first and second tape devices 108 and 110. In some embodiments, more than one server is contemplated. For example, the server 106 may transfer data from the first tape device 108 that may record road condition data. The server 106 may be a specialized server that is exclusively used by clientele that analyzes road metrics. Whereas a second server (not shown) may transfer data from the second tape device 110 that may record traffic congestion data. The second server may be a specialized server that is exclusively used by clientele that analyzes commute time metrics.

In some embodiments, the first and second tape devices 108 and 110 may each respectively include one or more ports. Each of the one or more ports may be respectively associated with a specific sensor (e.g., location sensor, UV sensor, vibration sensor, etc.) or sensors. Each of the specific sensors may record a specific datum (e.g., the location sensor records/identifies the GPS location of a vehicle, the UV sensor records/identifies the amount of light on the vehicle, etc.) and can stream the specific datum to the first and second tape devices 108 and 110. In some embodiments, the system 100 can use the specific data found from the specific sensors to make associations that might not normally be found about the vehicle, for instance, the system 100 may identify after multiple operations of a vehicle, that users are more likely to drive faster (e.g., data found from the speedometer) when it is over 90-degrees-Fahrenheit outside (e.g., data found from a thermometer).

In some embodiments, the first and second tape devices 108 and 110 can be connected to each specific sensor via a cable that extends from the one or more ports to the specific sensors. In some embodiments, the sensors determine what kind of data the first and second tape devices 108 and 110 will record on the tape media cartridges. It is noted that the first and second tape devices 108 and 110 may each be coupled/cabled to more than one specific sensor and record multiple instances of specific data at one time.

In some embodiments, the box enclosure 112 may include one or more openings associated to the positioning of the one or more ports. That is the box enclosure 112 may include holes that are placed where the ports for the first and second tape devices 108 and 110 are, thus allowing a cable to connect the first and second tape devices 108 and 110 to their respective specific sensors.

In some embodiments, the system 100 may include a main power input plug (not shown). The main power input plug may be on an exterior portion of the box enclosure 112. The main power input plug may be connected to a power supply of the vehicle. For instance, the box enclosure 112 may have the main power input plug attached to an autonomous vehicle's battery. The main power input plug may syphon power from the vehicle's battery and distribute the power to the first power supply 102 and the second power supply 104. The first power supply 102 may be attached to the server 106 and include a converter that converts the voltage distributed via the main input plug to a voltage usable by the server 106. Further, the second power supply 104 may be attached to the first tape device 108 and the second tape device 110 and include a converter that converts the voltage distributed via the main input plug to a voltage usable by the first tape device 108 and the second tape device 110.

In some embodiments, no converter may be necessary. In some embodiments, either the first power supply 102, or the second power supply 104 may be connected to the main power input plug (e.g., the first power supply 102 or the second power supply 104 may be the main power supply for the components of the box enclosure 112). In some embodiments, the main power input plug may be the only source supplying power to the components of the box enclosure 112 (e.g., alleviating the need for the first power supply 102 and the second power supply 104).

In some embodiments, the box enclosure 112 is mounted on/to the frame of the vehicle (or any other non-moveable part of the vehicle, e.g., inside the trunk, on a floor, etc.). The box enclosure 112 may be mounted on/to the frame via the shock absorber-type devices attached to the supports 114A-C. A bottom portion of the shock absorber-type devices may be attached to the vehicle frame and a top portion of the shock absorber-type devices may be attached, respectively, to bottom portions of the supports 114A-C. It is noted that the shock absorber-type devices minimize the vibration of the box as the vehicle is moving and prevent the disruption of the operation of the system 100 (e.g., the recording of data, transferring of data, etc.).

In some embodiments, the box enclosure 112 may be mounted on/to the frame via an active suspension attached to the supports 114A-C. The active suspension may be controlled based on an input from a specific sensor and utilize information from the specific sensors to minimize the vibration of the box enclosure 112 as the vehicle is moving. For example, the active suspension of the system 100 may include a port connection that receives traction data from a traction sensor. The active suspension may identify that the vehicle is turning by how the traction on the passenger's side tire is increasing and the traction on the driver's side tire is decreasing. The active suspension may utilize the identification and tilt the box enclosure 112 in an opposite direction of the turn (e.g., tilt toward the driver's side) to ensure that the box enclosure 112 stays in a physical equilibrium and the components of the box enclosure 112 are not interrupted during operation.

In some embodiments, cooling fans may be incorporated into the box enclosure 112 in order to keep the components encapsulated by the box enclosure 112 at desired temperatures (e.g., to avoid overheating, etc.). In some embodiments, it is envisioned that system 100 could be a "turn-key" style system with all major components (e.g., the first power supply 102, the second power supply 104, the server 106, the first tape device 108, and the second tape device 110) fully integrated and ready for use in a vehicle. In such an embodiment, an end user would supply power and a compatible data stream to make use of this envisioned system 100.

Figure 2:
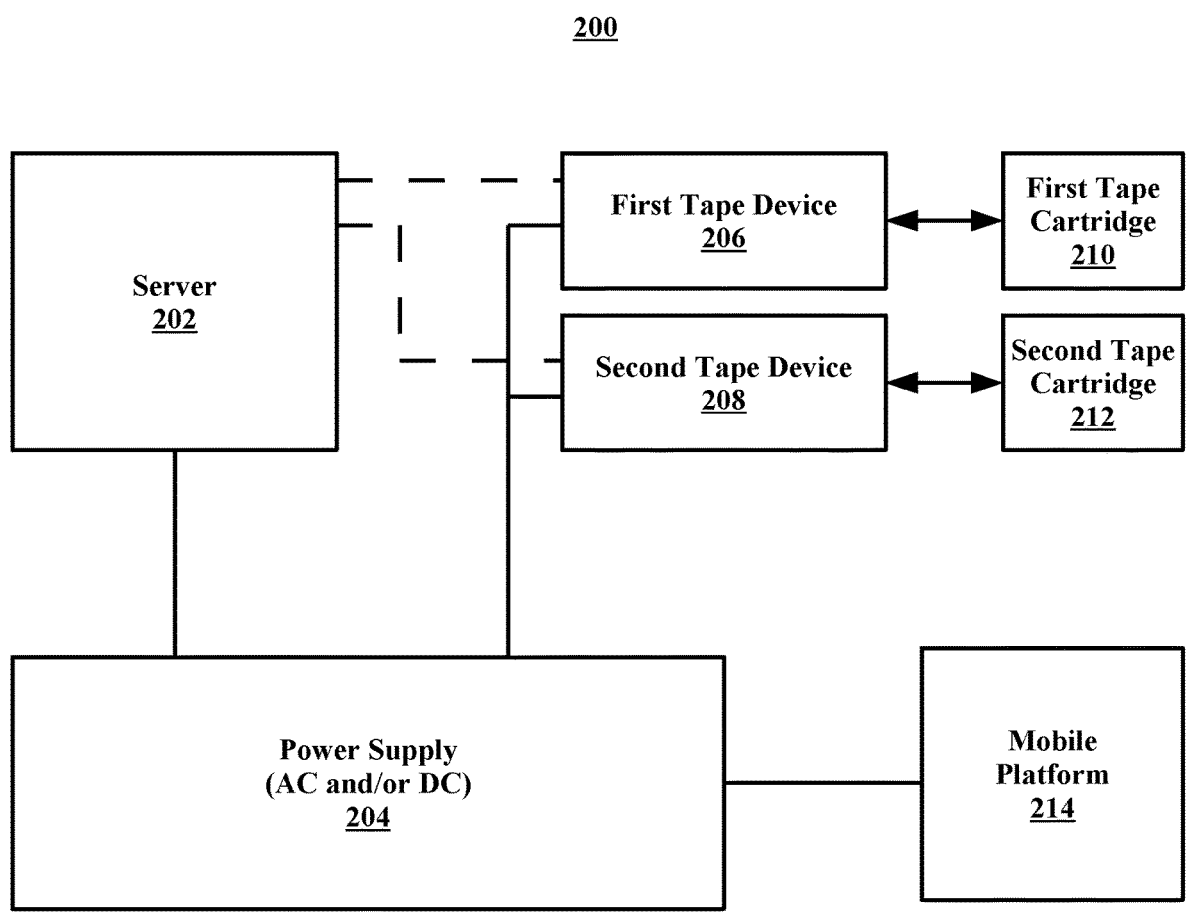
FIG. 2 illustrates a block diagram of an example system for the collection of mass data onboard a mobile platform, in accordance with embodiments of the present disclosure.

Referring now to FIG. 2, illustrated is a block diagram of an example system 200 for the collection of mass data onboard a mobile platform 214, in accordance with embodiments of the present disclosure. In some embodiments, the components of FIG. 2 may be the same and/or substantially similar to those discussed in regard to FIG. 1.

In some embodiments, the system 200 includes a box enclosure (not shown) that encapsulates a first tape device 206 and a second tape device 208 (e.g., tape drives) and includes a server 202, or servers, for controlling the first tape device 206 and the second tape device 208. The front of the first tape device 206 and the second tape device 208 may be exposed so that access to a first tape cartridge 210 and a second tape cartridge 212 is possible. The first tape cartridge 210 and the second tape cartridge 212 may include magnetic tape that can be used to store specific sensor data of a vehicle. Further, the first tape cartridge 210 and the second tape cartridge 212 may be removeable (as indicated by the two-way arrows in FIG. 2) as they can be inserted and removed, respectively, from the first tape device 206 and the second tape device 208 upon reaching a storage limit and/or as desired by a user.

In some embodiments, a main power input plug, acting as the power supply 204, can be on the exterior of the box enclosure and attach to a battery of a vehicle so that the vehicle power can be used to power the server 202, the first tape device 206, and the second tape device 208. In some embodiments, the power supply 204 may be an independent power supply (e.g., battery, solar panel, etc.) that is used to power the components of the system 200 (e.g., the server 202, the first tape device 206, and the second tape device 208). In some embodiments, within the box enclosure, the power supply 204 can convert (e.g., voltage, from AC to DC, etc.) and distribute power to the components of the system 200.

In some embodiments, the power supply 204 is fed power by the mobile platform 214 (e.g., the vehicle). The power supply 204 then distributes the power from the mobile platform 214 to the server 202, the first tape device 206, and the second tape device 208. The distribution of power is illustrated as solid lines in regard to FIG. 2.

In some embodiments, the server 202 controls the operation and function of the first tape device 206 and the second tape device 208. The operations may include the transfer of data between the server 202 and the first tape device 206 and the second tape device 208, which is indicated by the illustration of the dotted lines in regard to FIG. 2. The function of the server 202 allows for the capability of a user to wirelessly input commands to control the recording strategy of the first tape device 206 and the second tape device 208. It further allows for the wireless transmission of the data being recorded by the first tape device 206 and the second tape device 208 in the case that a user desires to have information presented to them before the removal and analysis of the data stored on the first tape cartridge 210 and the second tape cartridge 212.

Figure 3:
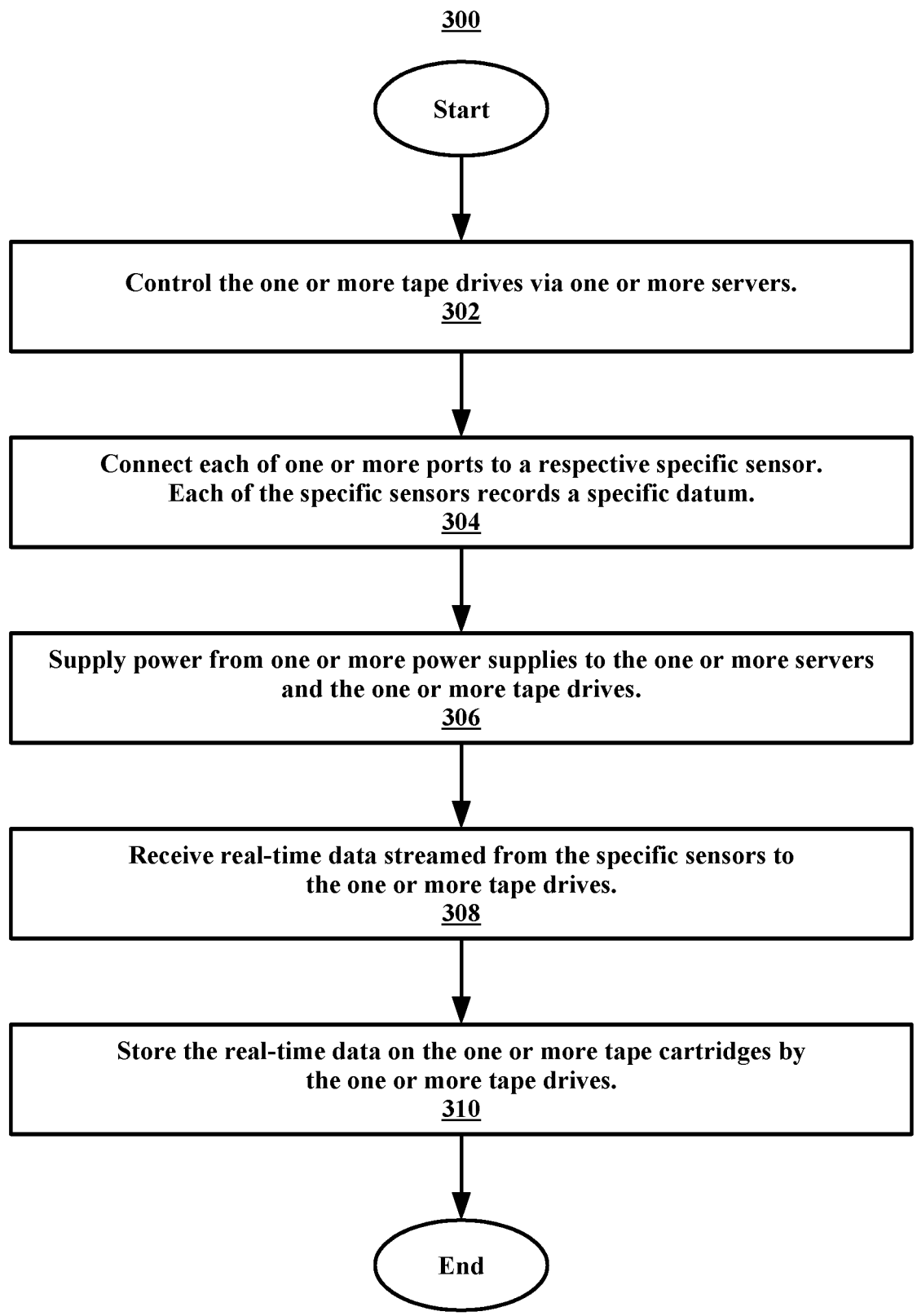
FIG. 3 illustrates a flowchart of an example method collecting a variety of real-time sensor data from a vehicle while the vehicle is operational, in accordance with embodiments of the present disclosure.

Referring now to FIG. 3, illustrated is a flowchart of an example method 300 for collecting a variety of real-time sensor data from a vehicle while the vehicle is operational, in accordance with embodiments of the present disclosure. In some embodiments, the method 300 may be performed by a processor or a processor in a system. In some embodiments, the method 300 begins at operation 302. At operation 302, the one or more tape drives are controlled via one or more servers. The servers may determine which tape drive(s) to grant power to, which tape drive(s) to operate, and/or which tape drive(s) to transfer data to and from.

In some embodiments, the method 300 proceeds to operation 304. At operation 304 each of one or more ports (of the one or more tape drives) is connected to a respective specific sensor. Each of the specific sensors records a specific datum. In some embodiments, the one or more ports may be found on an outside surface of a box enclosure that encapsulates the tape drives, servers, and power supplies (to be discussed in regard to operation 306). The ports on the box enclosure may be connected/cabled to the specific sensors and include an internal cable that is attached to the tape drives in order to transfer the specific sensor data to the tape drives for storage.

In some embodiments, the method 300 proceeds to operation 306 where one or more power supplies supply power to the tape drives, servers, and/or any other component that may need power to function. In some embodiments, the method 300 proceeds to operation 308. At operation 308, the one or more tape drives receive real-time data streamed from the specific sensors.

In some embodiments, the method 300 proceeds to operation 310 where the real-time data is stored on the one or more tape cartridges by the one or more tape drives. In some embodiments, the method 300 ends after operation 310.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
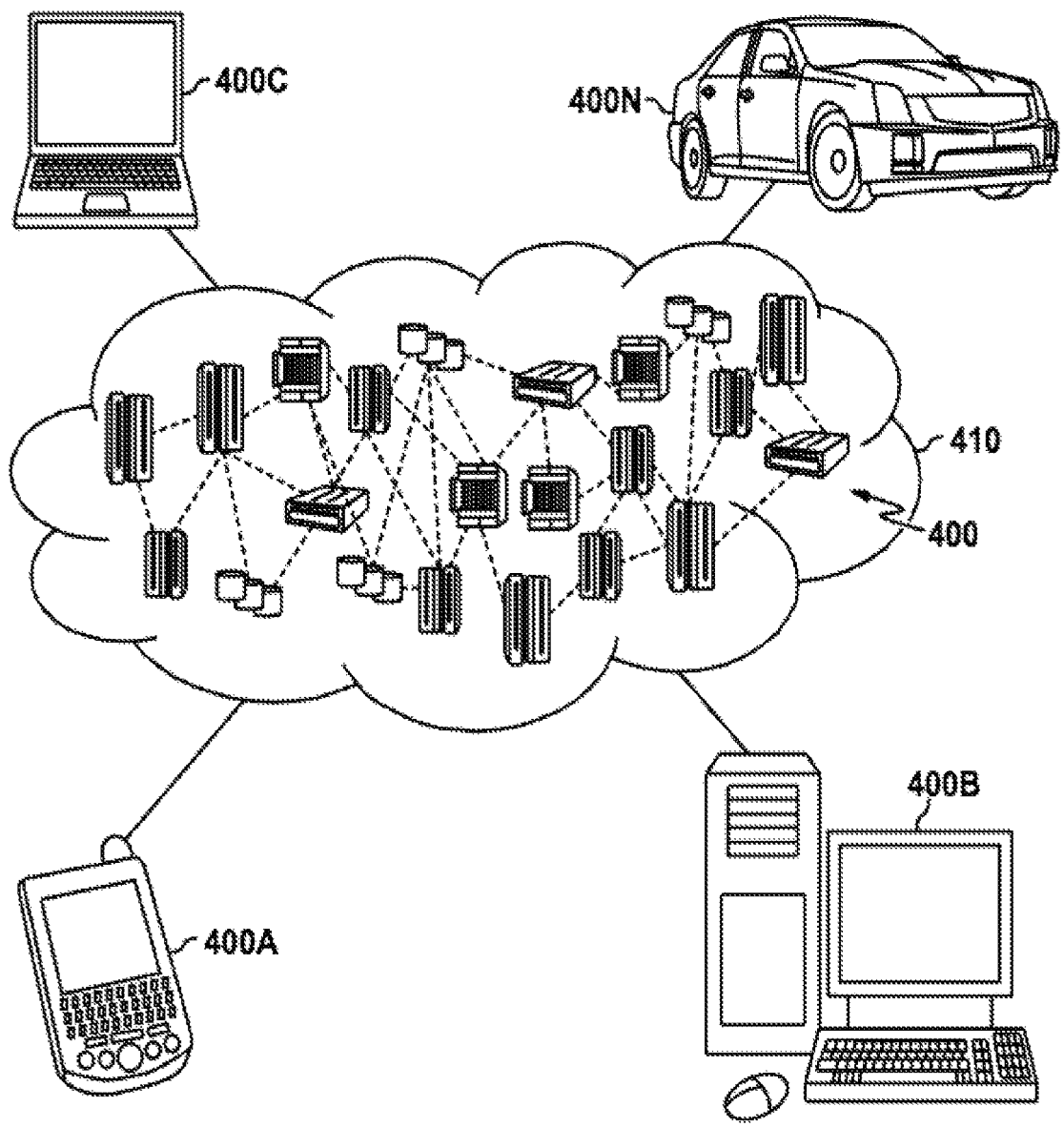
FIG. 4 depicts a cloud computing environment, in accordance with embodiments of the present disclosure.

Referring now to FIG. 4, illustrative cloud computing environment 410 is depicted. As shown, cloud computing environment 410 includes one or more cloud computing nodes 400 with which local computing devices used by cloud consumers, such as, for example, personal digital assistant (PDA) or cellular telephone 400A, desktop computer 400B, laptop computer 400C, and/or automobile computer system 400N may communicate. Nodes 400 may communicate with one another. They may be grouped (not shown) physically or virtually, in one or more networks, such as Private, Community, Public, or Hybrid clouds as described hereinabove, or a combination thereof.

This allows cloud computing environment 410 to offer infrastructure, platforms and/or software as services for which a cloud consumer does not need to maintain resources on a local computing device. It is understood that the types of computing devices 400A-N shown in FIG. 4 are intended to be illustrative only and that computing nodes 400 and cloud computing environment 410 can communicate with any type of computerized device over any type of network and/or network addressable connection (e.g., using a web browser).

Figure 5:
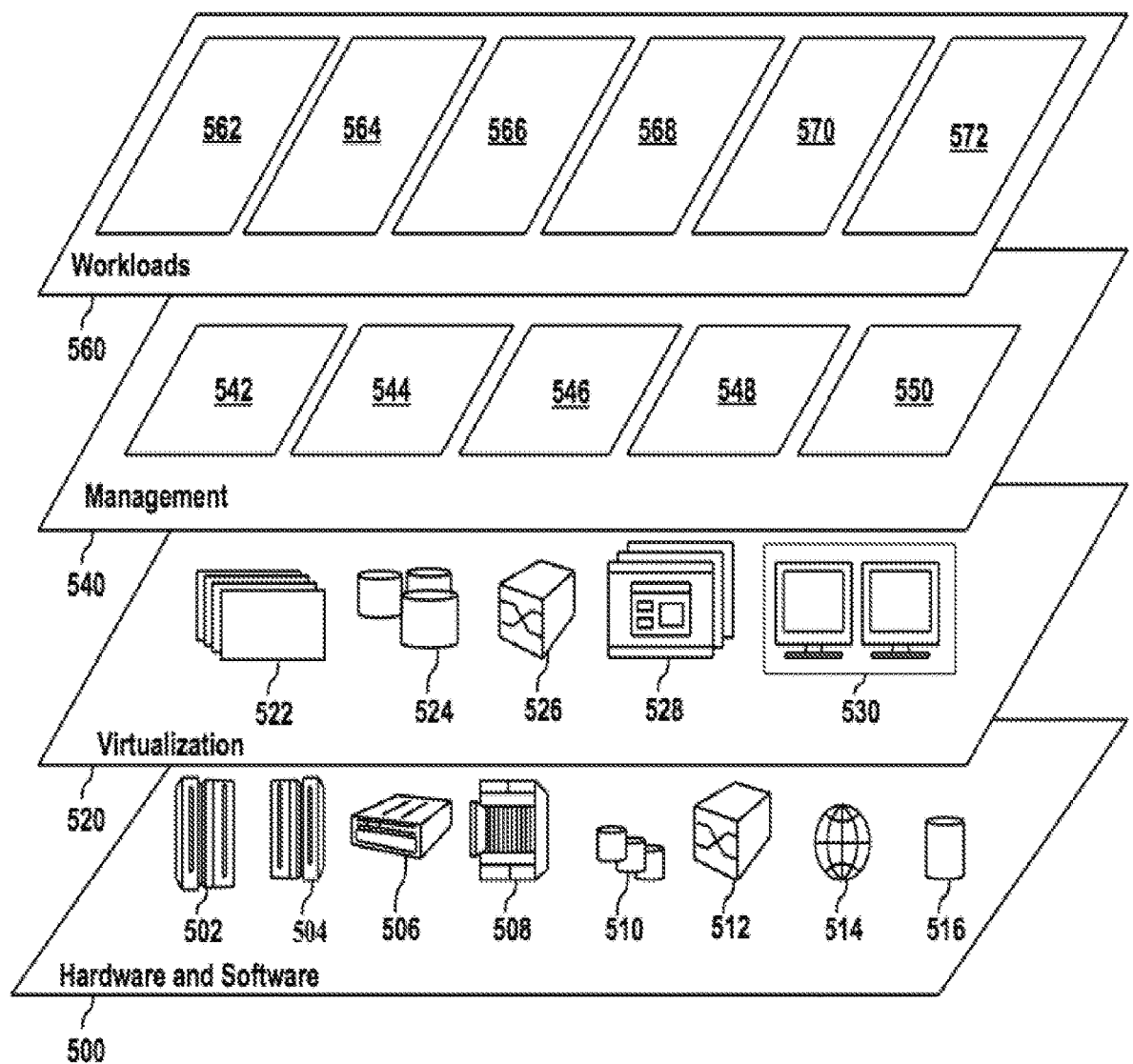
FIG. 5 depicts abstraction model layers, in accordance with embodiments of the present disclosure.

Referring now to FIG. 5, a set of functional abstraction layers provided by cloud computing environment 410 (FIG. 4) is shown. It should be understood in advance that the components, layers, and functions shown in FIG. 5 are intended to be illustrative only and embodiments of the disclosure are not limited thereto. As depicted below, the following layers and corresponding functions are provided.

Hardware and software layer 500 includes hardware and software components. Examples of hardware components include: mainframes 502; RISC (Reduced Instruction Set Computer) architecture based servers 504; servers 506; blade servers 508; storage devices 510; and networks and networking components 512. In some embodiments, software components include network application server software 514 and database software 516.

Virtualization layer 520 provides an abstraction layer from which the following examples of virtual entities may be provided: virtual servers 522; virtual storage 524; virtual networks 526, including virtual private networks; virtual applications and operating systems 528; and virtual clients 530.

In one example, management layer 540 may provide the functions described below. Resource provisioning 542 provides dynamic procurement of computing resources and other resources that are utilized to perform tasks within the cloud computing environment. Metering and Pricing 544 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 546 provides access to the cloud computing environment for consumers and system administrators. Service level management 548 provides cloud computing resource allocation and management such that required service levels are met. Service Level Agreement (SLA) planning and fulfillment 550 provide pre-arrangement for, and procurement of, cloud computing resources for which a future requirement is anticipated in accordance with an SLA.

Workloads layer 560 provides examples of functionality for which the cloud computing environment may be utilized. Examples of workloads and functions which may be provided from this layer include: mapping and navigation 562; software development and lifecycle management 564; telemetry 566; data analytics processing 568; transaction processing 570; and road condition mapping 572, etc.

Figure 6:
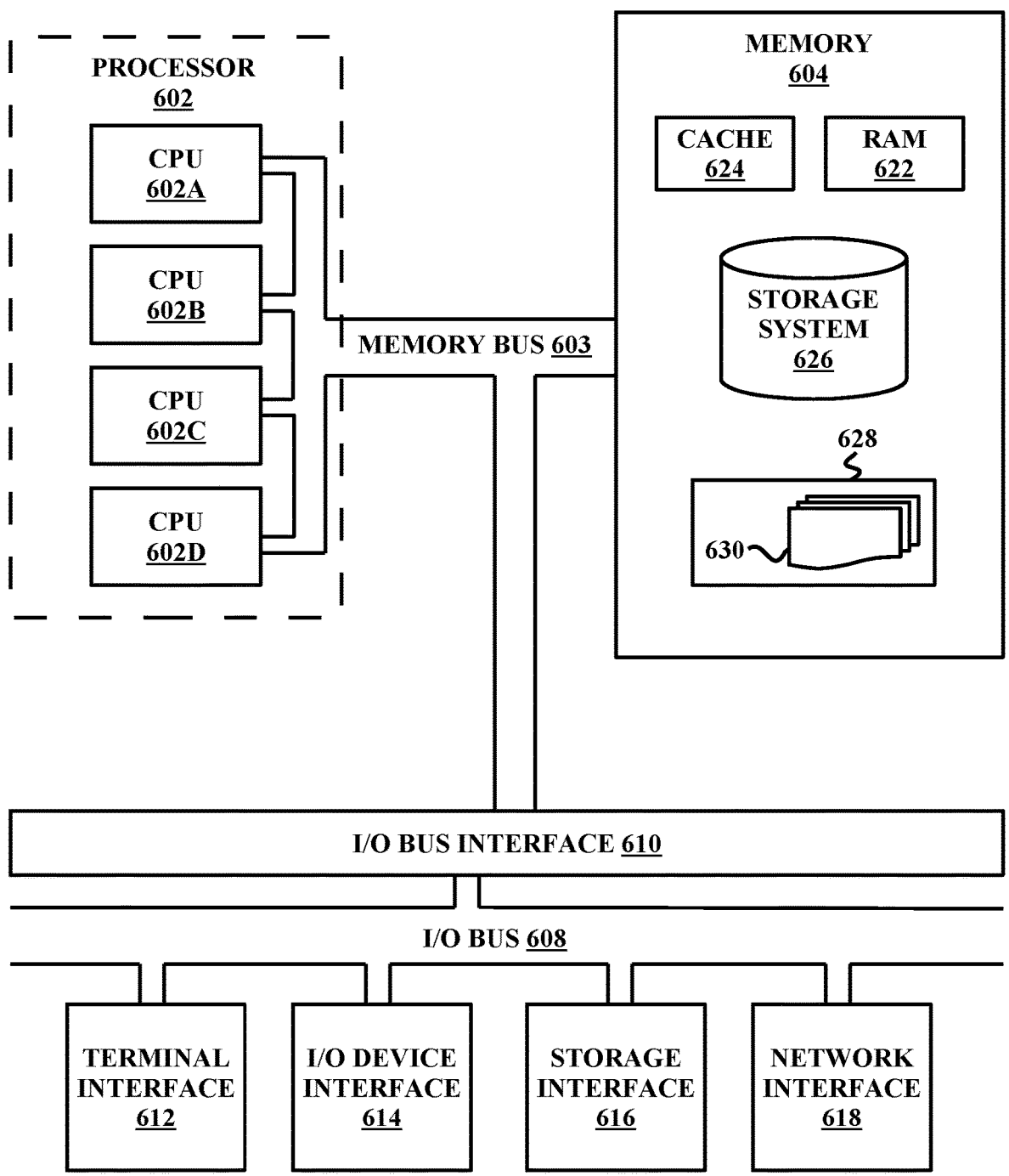
FIG. 6 illustrates a high-level block diagram of an example computer system that may be used in implementing one or more of the methods, tools, and modules, and any related functions, described herein, in accordance with embodiments of the present disclosure.

Referring now to FIG. 6, shown is a high-level block diagram of an example computer system 601 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 616, an I/O (Input/Output) device interface 614, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smartphone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A system for collecting a variety of real-time sensor data while a vehicle is mobile, the system comprising:
   one or more tape drives, wherein a front portion of the one or more tape drives allows access to one or more tape cartridges;
   one or more servers, wherein the one or more servers control the one or more tape drives;
   one or more ports communicatively connected to the one or more tape drives, wherein the one or more ports are associated with specific sensors, and wherein the specific sensors record specific datum; and
   one or more power supplies.

2. The system of claim 1, wherein the one or more servers further control the one or more ports by determining which of the one or more ports to power and operate.

3. The system of claim 1, further comprising:
   a box enclosure, wherein the box enclosure encapsulates the one or more tape drives, the one or more power supplies, and the one or more servers.

4. The system of claim 3, wherein the box enclosure includes one or more openings associated with a positioning of the one or more ports and one or more openings associated with exposing the front portion of the one or more tape drives.

5. The system of claim 2, further comprising:
   a main power input plug, wherein the main power input plug is on an exterior portion of the box enclosure, and wherein the main power input plug is connected to a power supply of the vehicle.

6. The system of claim 2, wherein the box enclosure is mounted on the vehicle frame with shock-absorbers that minimize the vibration of the box enclosure as the vehicle is moving.

7. The system of claim 6, wherein the box enclosure further includes at least two supports, wherein at least one support is attached to a first outer side of the box enclosure, and wherein the at least one other support is attached to a second outer side of the box enclosure that is opposite the first outer side.

8. The system of claim 7, wherein a bottom portion of the shock-absorbers are attached to the vehicle frame, and wherein a top portion of the shock-absorbers are attached, respectively, to bottom portions of the at least two supports.

9. The system of claim 2, wherein the box enclosure is mounted on the vehicle frame with an active suspension.

10. The system of claim 9, wherein the active suspension is controlled based on at least one of the specific sensors, and wherein the active suspension utilizes information from the at least one of the specific sensors to minimize the vibration of the box enclosure as the vehicle is moving.

11. A method for collecting a variety of real-time sensor data from a vehicle while the vehicle is operational, the method comprising:
   controlling the one or more tape drives via one or more servers;
   connecting one or more ports, associated with the one or more tape drives, to specific sensors, wherein the specific sensors record specific datum;
   supplying power from one or more power supplies to the one or more servers and the one or more tape drives;
   receiving real-time data streamed from the specific sensors to the one or more tape drives; and
   storing the real-time data on the one or more tape cartridges by the one or more tape drives.

12. The method of claim 11, wherein the one or more servers further control the one or more ports by determining which of the one or more ports to power and operate.

13. The method of claim 11, wherein the one or more tape drives, the one or more power supplies, and the one or more servers are encapsulated in a box enclosure.

14. The method of claim 13, wherein the box enclosure includes one or more openings associated with a positioning of the one or more ports and one or more openings associated with exposing the front portion of the one or more tape drives to allow access to one or more respective tape cartridges of each of the one or more tape drives.

15. The method of claim 12, wherein a main power input plug is attached to an exterior portion of the box enclosure and connected to a power supply of the vehicle.

16. The method of claim 12, wherein the box enclosure is mounted on the vehicle frame with shock-absorbers that minimize the vibration of the box enclosure as the vehicle is moving.

17. The method of claim 16, wherein the box enclosure further includes at least two supports, wherein at least one support is attached to a first outer side of the box enclosure, and wherein the at least one other support is attached to a second outer side of the box enclosure that is opposite the first outer side.

18. The method of claim 17, wherein a bottom portion of the shock-absorbers are attached to the vehicle frame, and wherein a top portion of the shock-absorbers are attached, respective, to bottom portions of the at least two supports.

19. The method of claim 12, wherein the box enclosure is mounted on the vehicle frame with an active suspension.

20. The method of claim 19, wherein the active suspension is controlled based on information from at least one of the specific sensors to minimize the vibration of the box enclosure as the vehicle is moving.

* * * * *